US012603105B2

(12) United States Patent
Ma et al.

(10) Patent No.: US 12,603,105 B2
(45) Date of Patent: Apr. 14, 2026

(54) LATCH FOR ZERO/FIXED SKEW DATA STORAGE DEVICE

(71) Applicant: Seagate Technology LLC, Fremont, CA (US)

(72) Inventors: YiChao Ma, Singapore (SG); Xiong Liu, Singapore (SG); Than Zaw Myint, Singapore (SG); Brendon Shi Wei Leong, Singapore (SG)

(73) Assignee: Seagate Technology LLC, Fremont, CA (US)

( * ) Notice: Subject to any disclaimer, the term of this patent is extended or adjusted under 35 U.S.C. 154(b) by 78 days.

(21) Appl. No.: 18/603,453

(22) Filed: Mar. 13, 2024

(65) Prior Publication Data

US 2024/0420734 A1     Dec. 19, 2024

Related U.S. Application Data

(60) Provisional application No. 63/507,764, filed on Jun. 13, 2023.

(51) Int. Cl.
*G11B 5/48*     (2006.01)
*G11B 5/53*     (2006.01)

(52) U.S. Cl.
CPC .............. *G11B 5/4826* (2013.01); *G11B 5/53* (2013.01)

(58) Field of Classification Search
None
See application file for complete search history.

(56) References Cited

U.S. PATENT DOCUMENTS

| | | | | |
|---|---|---|---|---|
| 5,363,261 | A | 11/1994 | Eckberg et al. | |
| 5,742,453 | A | 4/1998 | MacPherson | |
| 5,973,887 | A | 10/1999 | Cameron | |
| 6,016,240 | A | 1/2000 | Jargon et al. | |
| 7,385,781 | B1 * | 6/2008 | Craig ..................... | G11B 5/012 360/78.12 |
| 7,660,075 | B1 | 2/2010 | Lin et al. | |
| 7,684,155 | B1 | 3/2010 | Huang et al. | |
| 7,733,610 | B2 * | 6/2010 | Scura ..................... | G11B 21/12 360/265.7 |
| 8,089,733 | B2 * | 1/2012 | Ng ........................ | G11B 5/6005 360/245.3 |
| 10,699,730 | B1 * | 6/2020 | Uefune .............. | G11B 19/2009 |
| 10,930,307 | B2 | 2/2021 | Sukla et al. | |
| 11,043,235 | B2 * | 6/2021 | Mendonsa ........... | G11B 17/021 |
| 11,308,984 | B2 | 4/2022 | Herdendorf et al. | |
| 11,348,611 | B1 * | 5/2022 | Mendonsa ............. | G11B 21/22 |
| 11,361,787 | B1 * | 6/2022 | Mendonsa ........... | G11B 5/5578 |
| 11,443,775 | B1 | 9/2022 | Herdendorf et al. | |

(Continued)

FOREIGN PATENT DOCUMENTS

EP          0834870 B1     4/2004

*Primary Examiner* — Fred Tzeng
(74) *Attorney, Agent, or Firm* — Mueting Raasch Group

(57) ABSTRACT

An apparatus includes a data storage disc having a read/write surface, and an arm extending along an arm axis and having a head end that supports a head that is configured to interact with the read/write surface. The apparatus also includes a rail extending along a rail axis that is normal to the arm axis, and a carriage coupled to the arm and movably coupled to the rail. The apparatus further includes a latch mechanism configured to releasably hold the carriage to the rail at a fixed position.

20 Claims, 10 Drawing Sheets

(56) References Cited

U.S. PATENT DOCUMENTS

| | | | |
|---|---|---|---|
| 11,468,909 B1 * | 10/2022 | Liang | G11B 5/4826 |
| 11,948,612 B2 * | 4/2024 | Mendonsa | G11B 5/56 |
| 2004/0156144 A1 * | 8/2004 | Kang | G11B 5/6005 |
| | | | 360/235.8 |
| 2008/0192385 A1 | 8/2008 | Choi et al. | |
| 2010/0014194 A1 * | 1/2010 | Kim | G11B 5/54 |
| 2019/0333533 A1 * | 10/2019 | Mendonsa | G11B 5/4826 |
| 2021/0312945 A1 * | 10/2021 | Mendonsa | G11B 5/016 |
| 2022/0201884 A1 | 6/2022 | Herdendorf et al. | |
| 2022/0213876 A1 | 7/2022 | Herdendorf et al. | |
| 2022/0238137 A1 | 7/2022 | Herdendorf et al. | |
| 2022/0293131 A1 | 9/2022 | Herdendorf et al. | |
| 2022/0335970 A1 * | 10/2022 | Mendonsa | G11B 5/56 |
| 2023/0005502 A1 | 1/2023 | Mendonsa et al. | |
| 2023/0032300 A1 | 2/2023 | Herdendorf et al. | |

* cited by examiner

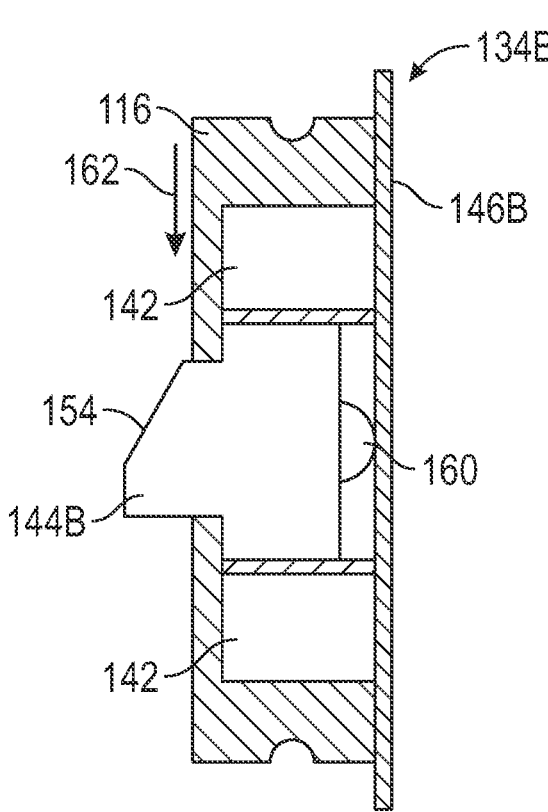
FIG. 6A          FIG. 6B
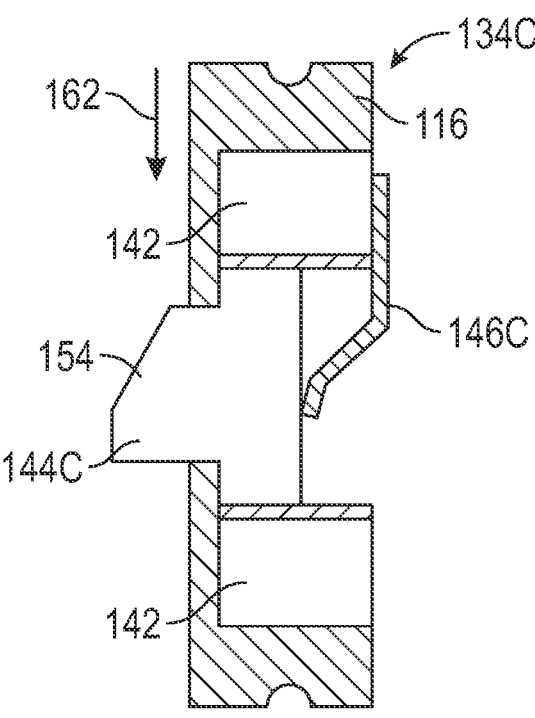
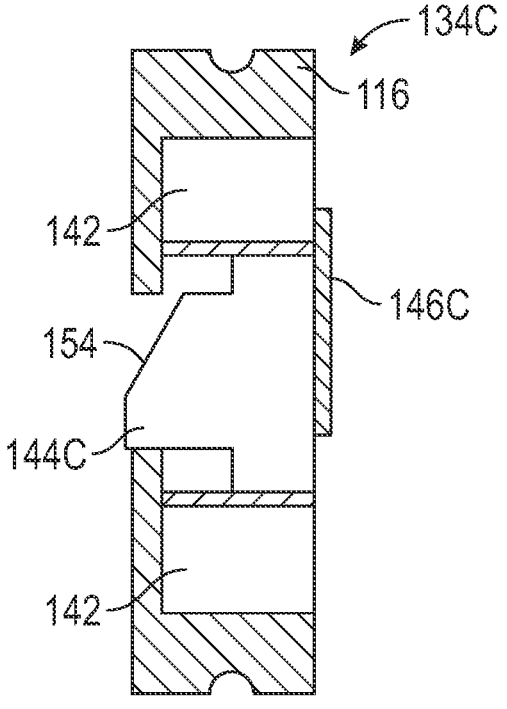
FIG. 7A          FIG. 7B

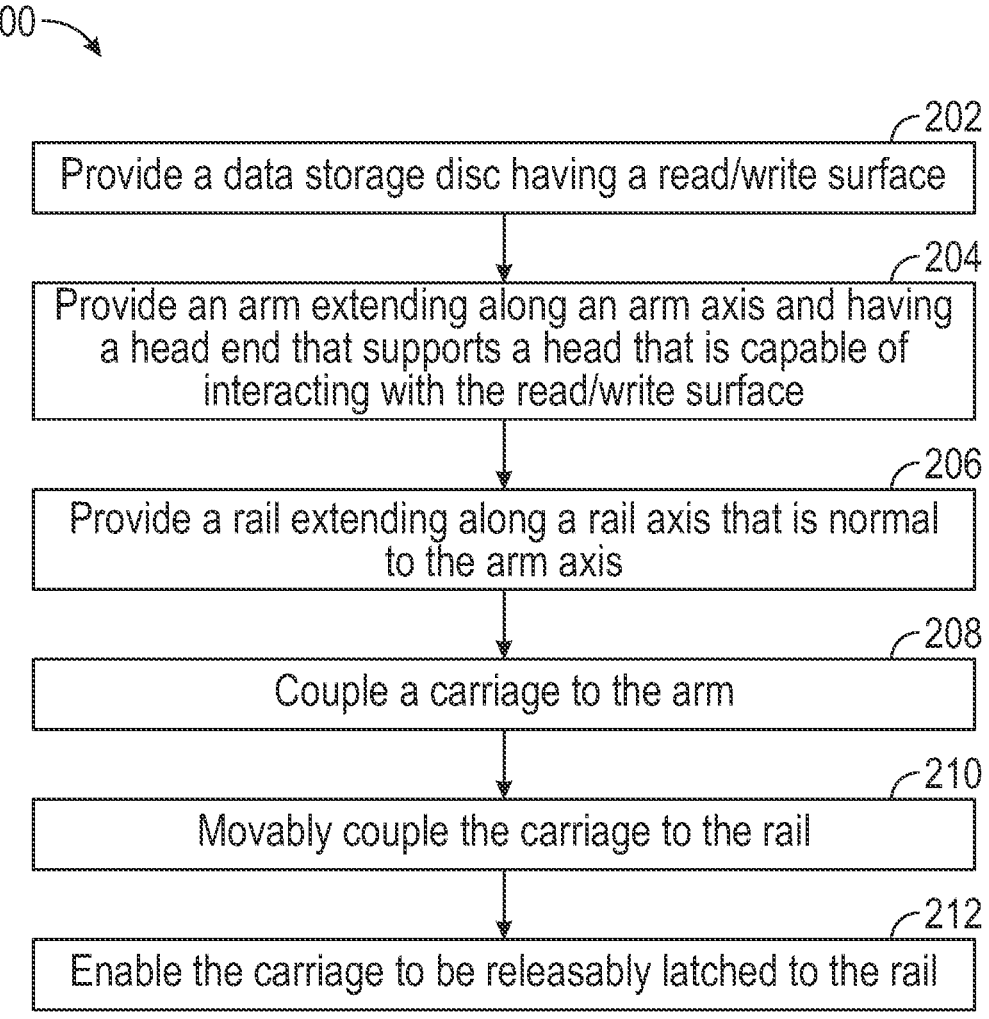

200

202
Provide a data storage disc having a read/write surface

204
Provide an arm extending along an arm axis and having a head end that supports a head that is capable of interacting with the read/write surface 206
Provide a rail extending along a rail axis that is normal to the arm axis 208
Couple a carriage to the arm 210
Movably couple the carriage to the rail 212
Enable the carriage to be releasably latched to the rail

FIG. 8

LATCH FOR ZERO/FIXED SKEW DATA STORAGE DEVICE

CROSS REFERENCE TO RELATED APPLICATIONS

This application claims the benefit of priority from U.S. provisional patent application No. 63/507,764, filed Jun. 13, 2023, which is hereby incorporated by reference in its entirety.

SUMMARY

In one embodiment, a data storage device is provided. The data storage device includes a data storage disc having a read/write surface defining an x-y plane, a ramp adjacent to an outer diameter of the data storage disc, and a linear actuator assembly. The linear actuator assembly includes a rail extending along a rail axis and having a first engagement member, and a carriage movably coupled to the rail and having a second engagement member configured for coupling to the first engagement member. The linear actuator assembly also includes an arm coupled to the carriage and extending along an arm axis that is normal to the rail axis. The arm has a head end that is movable relative to the data storage disc by movement of the carriage along the rail in the x-y plane. The liner actuator assembly further includes a head supported by the head end of the arm. The head is configured to communicate with the read/write surface when positioned at the data storage disc. The head end of the arm is configured to be supported by the ramp when retracted away from the data storage disc. The first and second engagement members are configured to couple together when the head end of the arm is supported by the ramp, thereby latching the carriage to the rail.

In another embodiment, an apparatus is provided. The apparatus includes a data storage disc having a read/write surface, and an arm extending along an arm axis and having a head end that supports a head that is configured to interact with the read/write surface. The apparatus also includes a rail extending along a rail axis that is normal to the arm axis, and a carriage coupled to the arm and movably coupled to the rail. The apparatus further includes a latch mechanism configured to releasably hold the carriage to the rail at a fixed position.

In yet another embodiment, a method is provided. The method includes providing a data storage disc having a read/write surface, providing an arm extending along an arm axis and having a head end that supports a head that is capable of interacting with the read/write surface, and providing a rail extending along a rail axis that is normal to the arm axis. The method also includes coupling a carriage to the arm, and movably coupling the carriage to the rail. The method further includes enabling the carriage to be releasably latched to the rail.

This summary and the Abstract are provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views. All descriptions are applicable to like and analogous structures throughout the several embodiments, unless otherwise specified.

FIGS. 6A and 6B are cross-sectional views that illustrate a solenoid latch including an clastic spring in accordance with one embodiment.

FIGS. 7A and 7B are cross-sectional views that illustrate a solenoid latch including a flat metal spring in accordance with one embodiment.

FIG. 8 is a flowchart of a method embodiment.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art that fall within the scope of the principles of this disclosure.

DETAILED DESCRIPTION OF ILLUSTRATIVE EMBODIMENTS

Embodiments of the disclosure relate to latches for zero/fixed skew data storage devices. One example of a data storage device is a hard disc drive (HDD) in which data is stored on tracks on surfaces of one or more data storage discs. Conventional HDDs typically employ heads supported by arms connected to rotary actuators to read data from and write data to tracks on surfaces of data storage discs. In such conventional HDDs, the rotary actuator, whose stroke extends along an arc, makes the heads skew with respect to the circular track orientation. This may prevent tracks from being very closely spaced, and may thereby negatively impact areal density. In contrast, HDDs that employ, for example, linear actuator assemblies allow for zero skew (or fixed skew) throughout the entire stroke of the actuator arm or head stack assembly. This allows for increased areal density of a HDD with a linear actuator assembly compared to a HDD with a rotating arm.

Due to differences in size, structure and/or operation between rotary and linear actuator assemblies, a latch utilized to hold a rotary actuator in place at a predetermined position may be unsuitable for utilization in a HDD with a linear actuator. Embodiments of the disclosure described below provide latches for linear actuators.

Figure 1A:
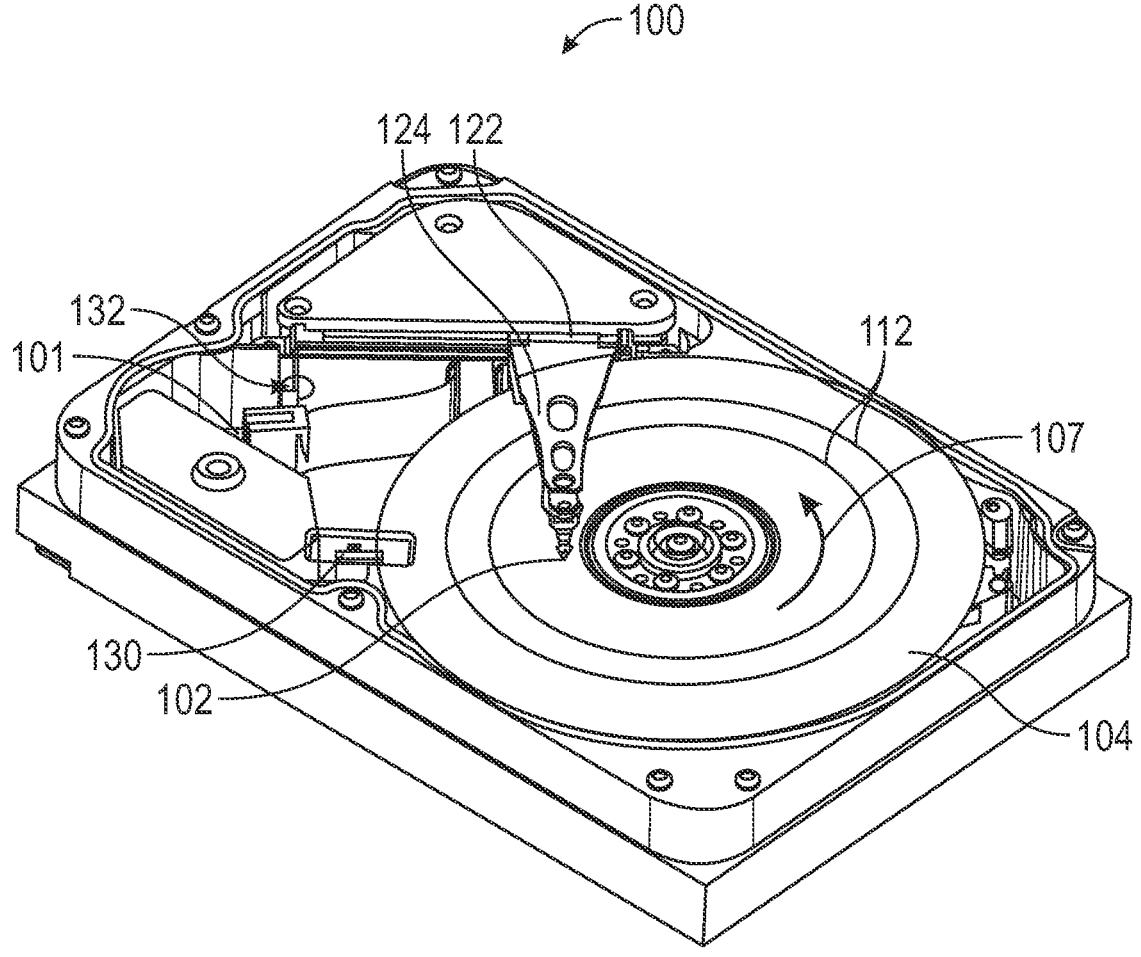
FIGS. 1A and 1B are perspective views of a data storage device in accordance with one embodiment.
Figure 1B:
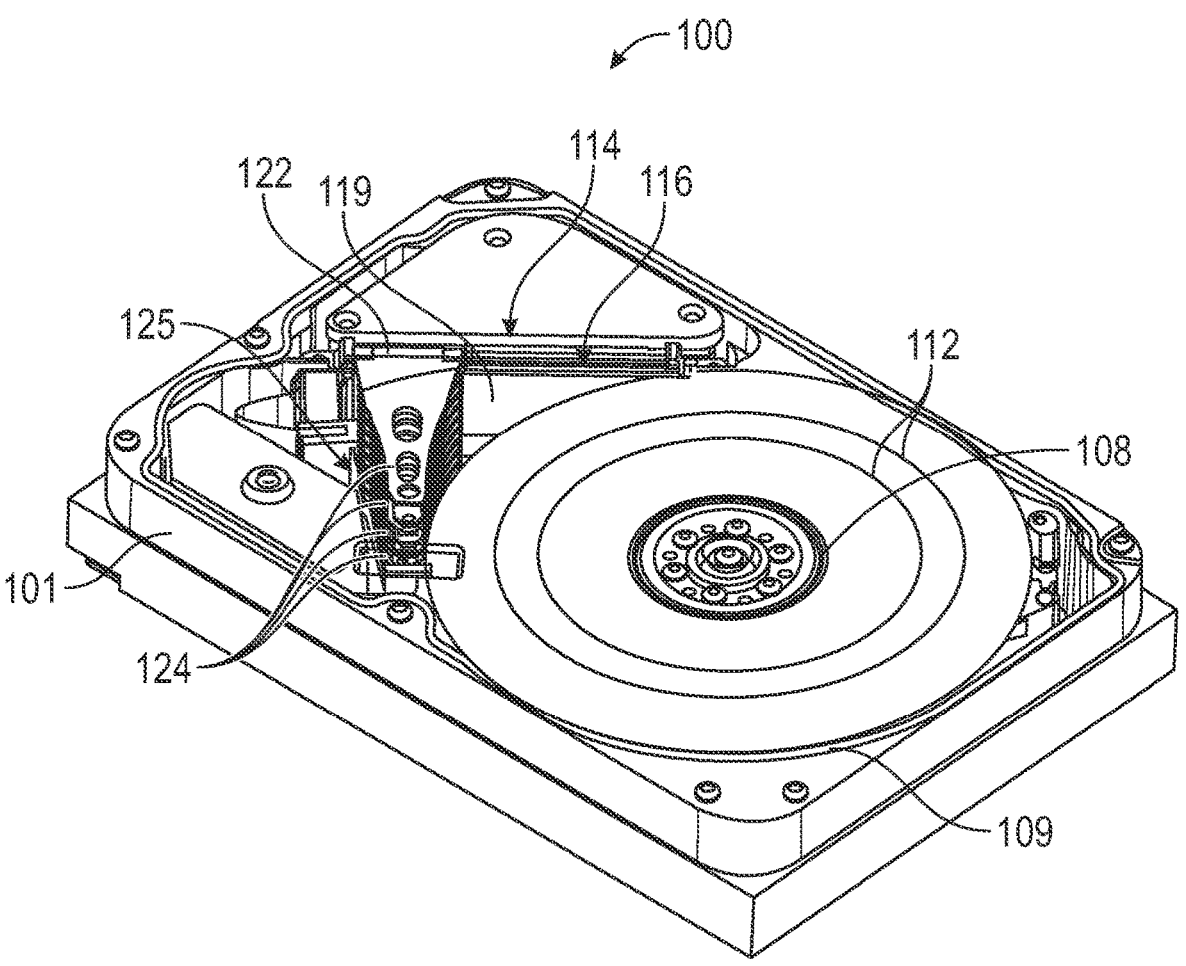
Figure 1C:
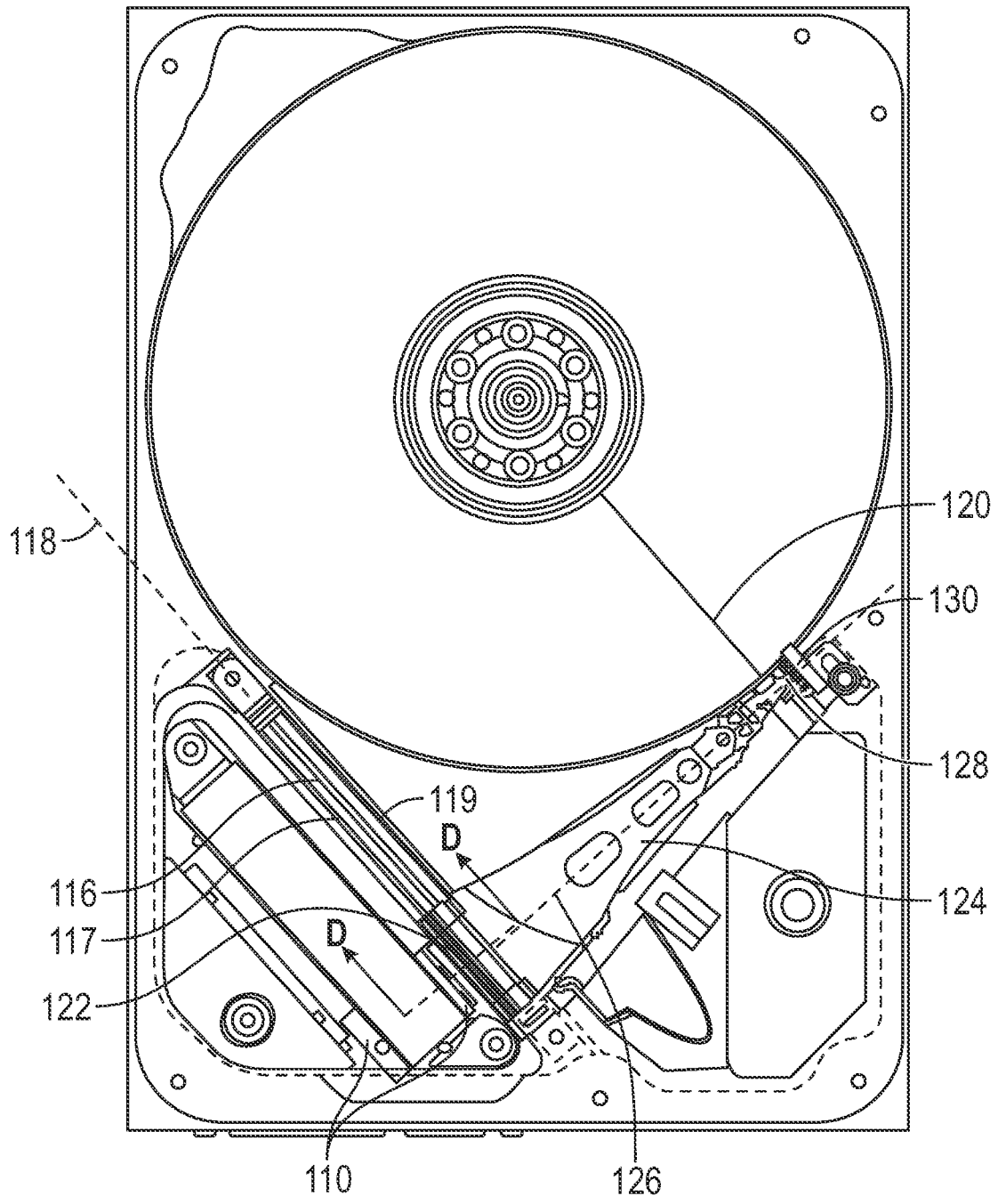
FIG. 1C is a top view of the data storage device of FIGS. 1A and 1B.

FIGS. 1A and 1B are perspective views of a data storage device 100 with a linear actuator assembly that may employ a latch in accordance with embodiments of the disclosure. FIG. 1C is a top view of data storage device 100. Data storage device 100 shown in FIGS. 1A, 1B and 1C is for illustration purposes only. Embodiments of the present disclosure are not limited to any particular data storage device such as the data storage device 100 shown in FIGS. 1A, 1B and 1C. Embodiments of the present disclosure are illustratively practiced within any number of different types of data storage devices.

It should be noted that the same or similar reference numerals are used in different figures for the same or similar elements. All descriptions of an element also apply to all other versions of that element unless otherwise stated. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

It will be understood that, when an element is referred to as being "connected," "coupled," or "attached" to another element, it can be directly connected, coupled or attached to the other element, or it can be indirectly connected, coupled, or attached to the other element where intervening or intermediate elements may be present. In contrast, if an element is referred to as being "directly connected," "directly coupled" or "directly attached" to another element, there are no intervening elements present. Drawings illustrating direct connections, couplings or attachments between elements also include embodiments, in which the elements are indirectly connected, coupled or attached to each other.

Referring to FIGS. 1A, 1B and 1C, data storage device 100 includes a base deck 101 that mates with a top cover (not shown) to form an enclosed housing. Elements of the data storage device 100 within the housing include heads 102 that may be positioned over and/or under data storage media 104 to read data from and/or write data to the data storage media 104. In the embodiment shown in FIGS. 1A, 1B and 1C, the data storage media 104 are rotatable data storage discs, with each disc 104 having opposing surfaces that serve as data storage surfaces. For read and write operations, a spindle motor (not shown) rotates the media 104 as illustrated by arrow 107 and an actuator mechanism 110 (shown in FIG. 1C) positions the heads 102 relative to data tracks 112 on the rotating media 104 between an inner diameter (ID) 108 and an outer diameter (OD) 109. Both the spindle motor and actuator mechanism 110 are connected to and operated through drive circuitry (not shown).

Actuator mechanism 110 and heads 102 are a part of a linear actuator assembly 114, which also includes one or more rails 116 extending along a rail axis 118 (or a parallel rail axis in the case of more than one rail 116). In an exemplary embodiment, rail axis 118 is parallel to a radius 120 of disc 104 on which the head 102 travels. The rail 116 may define any suitable cross-sectional shape, such as square, rectangular, circular, or oval, for example. Further, the rail 116 may include or be formed of any suitable material, such as stainless steel, or titanium, for example.

Linear actuator assembly 114 further includes a carriage 122 that is movably coupled to the rail 116. As can be seen in FIG. 1C, the actuator mechanism 110 is coupled to a portion of the carriage 122 that is behind a first side 117 of the rail 116 that faces away from the disc 104 stack. A second portion of the carriage 122, which is in front of a second side 119 of the rail 116 that faces the disc 104 stack, is coupled to actuator arms 124. Actuator arms 124 collectively form an E-block or a head stack assembly 125 that is also a part of liner actuator assembly 114. Each actuator arm 124 extends along an arm axis 126 that is normal to both the rail axis 118 and the disc radius 120. Each actuator arm 124 includes at least one head 102 for reading and writing data from and to the recording medium 104. The at least one head 102 is located at a distal head end 128 of the actuator arm 124. Each actuator arm 124 is movably attached to the rail 116 via the carriage 122 such that motion in the x-y plane is restricted to sliding motion along the rail 116. In other words, the actuator arm 124 moves linearly and, therefore, the at least one head 102 also moves linearly relative to the recording medium 104, along radius 120.

In order to keep read/write heads 102 from landing on discs 104 in a data storage device 100 when, for example, power is removed from the data storage device 100, and to prevent the heads 102 from colliding with outer edges of the discs 104 during load and unload operations, a head support ramp 130 is provided adjacent to the OD 109 of the discs 104. Thus, when heads 102 are moved from, for example, the position shown in FIG. 1A to a location away from the discs 104 that can be seen in FIGS. 1B and 1C, the head end 128 may be supported by ramp 130.

When the carriage 122 brings the E-block 125 to the position in which the heads 102 are at the ramp 130, a latch mechanism 132 is engaged to releasably hold the carriage 122 at a fixed position relative to the rail 116. Details regarding one example embodiment of latch mechanism 132 are provided below in connection with FIG. 1D.

Figure 1D:
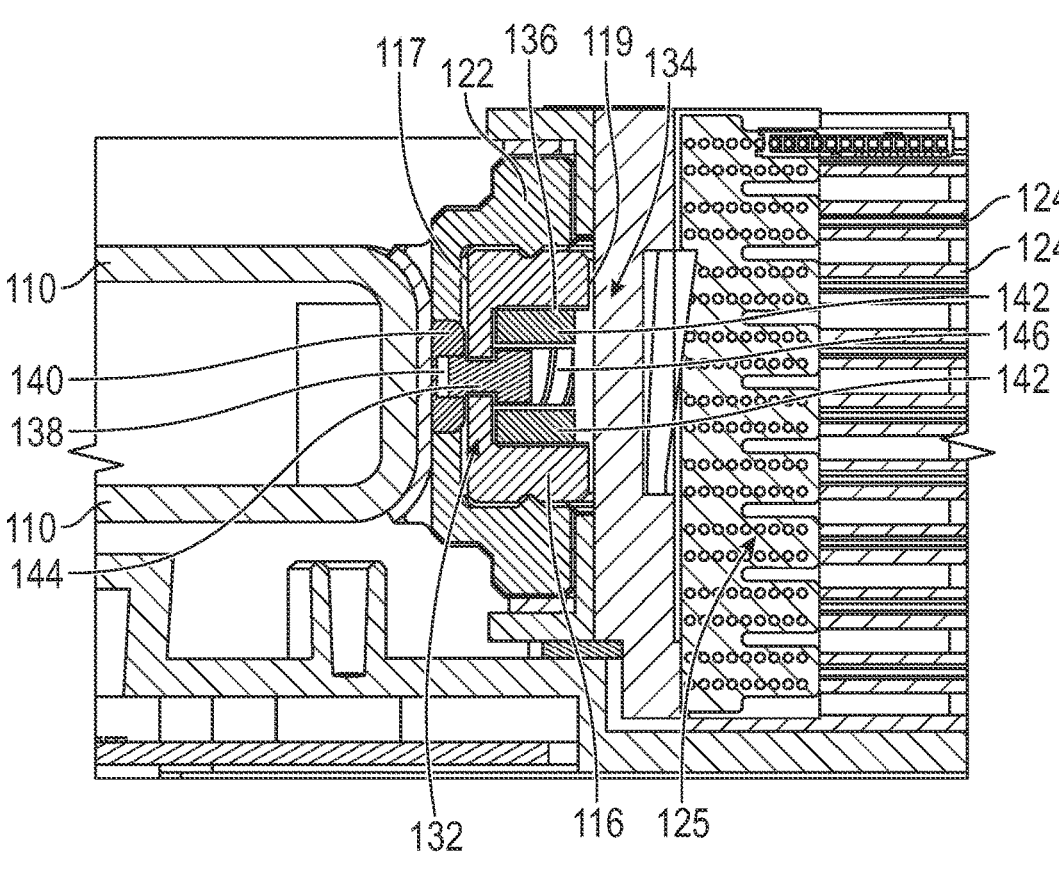
FIG. 1D is a side sectional view of a portion of the data storage device, taken along line D-D of FIG. 1C.
Figure 2A:
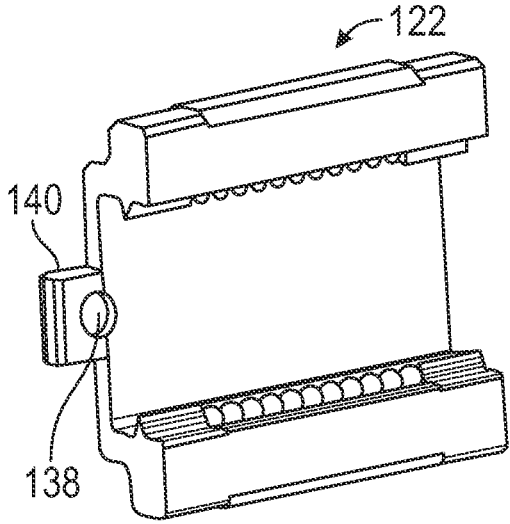
FIG. 2A is a perspective view of a carriage in accordance with one embodiment.
Figure 2B:
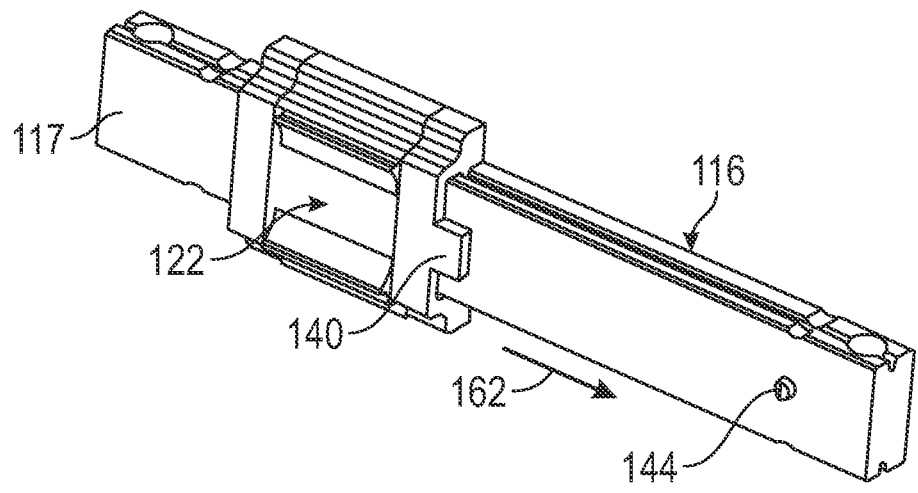
FIG. 2B is a perspective view of an assembly including the carriage of FIG. 2A coupled to a rail in accordance with one embodiment.

FIG. 2A is a perspective view of carriage 122 in accordance with one embodiment. Carriage 122 includes carriage extension 140 with blind hole 138 that is suitably sized to receive a latch pin 144 from a solenoid latch mechanism 134. FIG. 2B is a perspective view of an assembly including carriage 122 coupled to rail 116 in accordance with one embodiment. Latch pin 144 is positioned along rail 116 such that carriage 122 with blind hole 138 can engage with the latch pin 144 when actuator mechanism 110 moves the carriage 122 with the attached E-block 125 to a position where head end 128 is parked on ramp 130. Referring to FIG. 2B, for the blind hole 138 to engage with the latch pin 144, the carriage 122 slides in direction 162 (to the right as depicted) along rail 116. Electrical power is supplied to coil 142 so that a magnetic field forms around the coil 142 and draws the latch pin 144 inwardly so that it is within the rail 116. Once the blind hole 138 of carriage 122 is aligned with latch pin 144, ceasing the power supply to coil 142 allows latch pin 144 of rail 116 to be pushed outwardly by spring 146 (see FIG. 1D) and into the blind hole 138 of carriage 122. Inward movement of the latch pin 144 is described further below in connection with FIGS. 3A-3F, which illustrate latch 132 operation during a normal head unload operation, and FIGS. 4A-4D, which illustrate latch 132 operation during an emergency head unload operation. It should be noted that, during a data storage device 100 seek operation, the carriage 122 moves along the rail 116, but does not contact the latch pin 144. Hence, there is no power input to the latch 132 during seeks, and latch pin 144 is in a closed condition (e.g., with the latch pin 144 protruding from the rail 116 as shown in FIG. 2B) during seek and read/write drive operations.

FIG. 1D is a cross-sectional view of a portion of the data storage device 100, taken along line D-D of FIG. 1C. FIG. 1D shows latch mechanism 132 in an engaged state when heads 102 are at the ramp 130. In the engaged state, the latch mechanism 132 holds the carriage 122 to the rail 116 at a fixed position, thereby preventing carriage 122 from being moved by actuator mechanism 110 along the rail 116 until that latch 132 is released. In the embodiment of FIG. 1D, actuator mechanism 110 (e.g., a coil that interacts with magnets (not shown)) is coupled to carriage 122 by any suitable bonding material or fastener. Latch 132 includes a solenoid latch mechanism 134 within a hole 136 in rail 116. A blind hole 138 in a carriage extension 140 is configured to receive a latch pin 144 from the solenoid latch mechanism 134. In general, latch mechanism 132 may include any suitable first and second engagement members in or attached to rail 116 and carriage 122, respectively.

In the embodiment of FIG. 1D, solenoid latch mechanism 134 includes a coil 142, latch pin 144 and spring 146. Coil 142 may be a copper helical coil for example, that is connected to an electrical power supply (not shown in FIG. 1D). Latch pin 144 may, for example, be made of a ferrous material. In the position shown in FIG. 1D, no power is supplied to the solenoid latch mechanism 134, and the spring 146 urges the latch pin 144 into the blind hole 136. When latch pin 144 is within blind hole 136 as shown in FIG. 1D, carriage 122 cannot move along rail 116. In one embodiment, when electrical power is supplied to coil 142, introducing current into the coil 142, a magnetic field forms around the coil 142 that draws the latch pin 144 inwardly (toward the right as illustrated), thereby compressing spring 146 and causing the latch pin 144 to withdraw from the blind hole 136 in carriage extension 140. This releases carriage 122 for movement along rail 116.

Figure 1E:
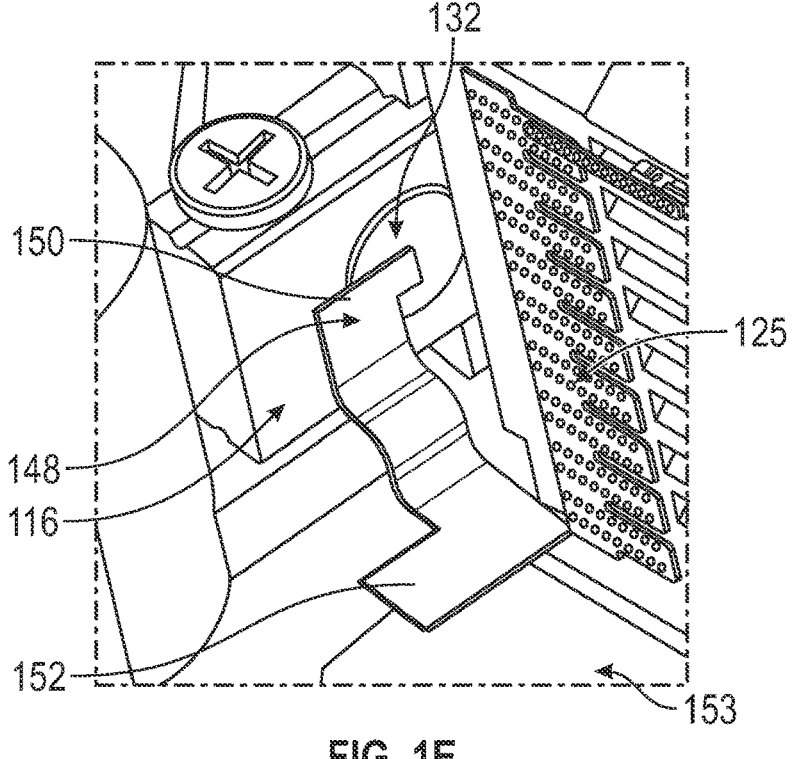
FIG. 1E is an enlarged view of a portion of the data storage device of FIGS. 1A-1C.

FIG. 1E is an enlarged view of a portion of the data storage device 100 of FIGS. 1A-1C showing an electrical connection to the latch 132. As can be seen in FIG. 1E, latch 132 receives its power via a flexible circuit connector 148 that has a first end 150 connected to latch 132 and a second end 152 connected to a printed circuit card assembly (PCCA) 153 that may receive power from a source that is external to the data storage device 100.

Figures 3A, 3B, 3C, 3D, 3E, 3F:
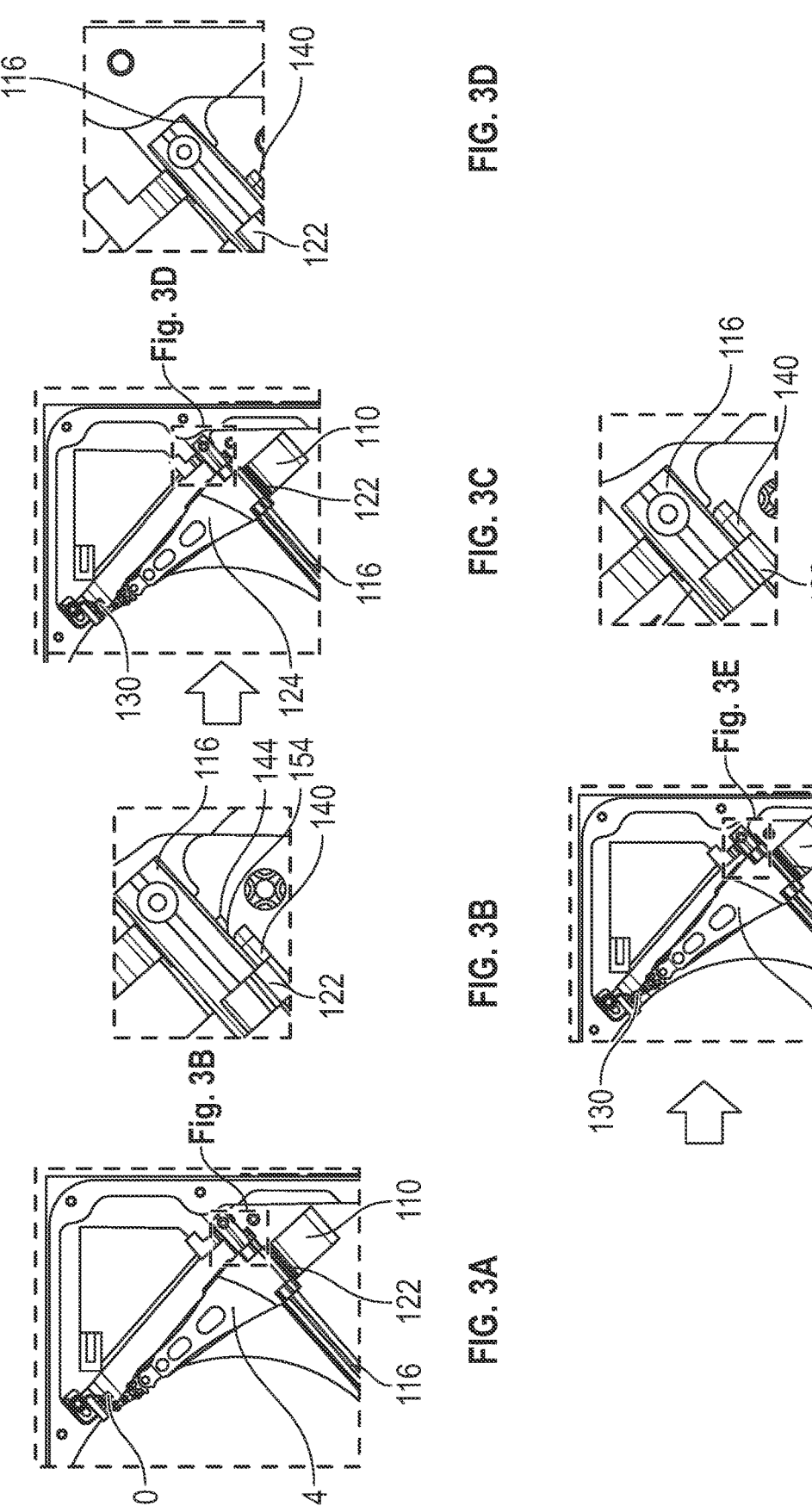
FIGS. 3A-3F are top views of portions of the data storage device of FIGS. 1A-1C that together illustrate latch operation during a normal head unload operation.

FIGS. 3A-3F are top views of portions of the data storage device of FIGS. 1A-1C that together illustrate latch 132 operation during a normal head unload operation. FIGS. 3B, 3D and 3F are enlarged views of portions of FIGS. 3A, 3C and 3E, respectively. FIGS. 3A and 3B show an initial stage of a normal unload operation, when the head 102 approaches the ramp 130; latch pin 144 protrudes outward from rail 116. As shown in FIGS. 3C and 3D, current is applied to coil 142 of solenoid latch mechanism 134. In response to current being applied to latch pin 144, the latch pin 144 retracts. The actuator mechanism 110 continues to move the carriage 122 until the heads 102 are parked on the ramp 130, in the position shown in FIG. 3E. In this position, as shown in FIG. 3F, the latch pin 144 and the blind hole 138 in carriage extension 140 are aligned. The current to coil 142 is cut off, and the latch pin 144 engages to the blind hole 138 in the carriage 122 to lock it to the rail 116. This process is reversed for a load operation.

Figures 4A, 4B, 4C, 4D:
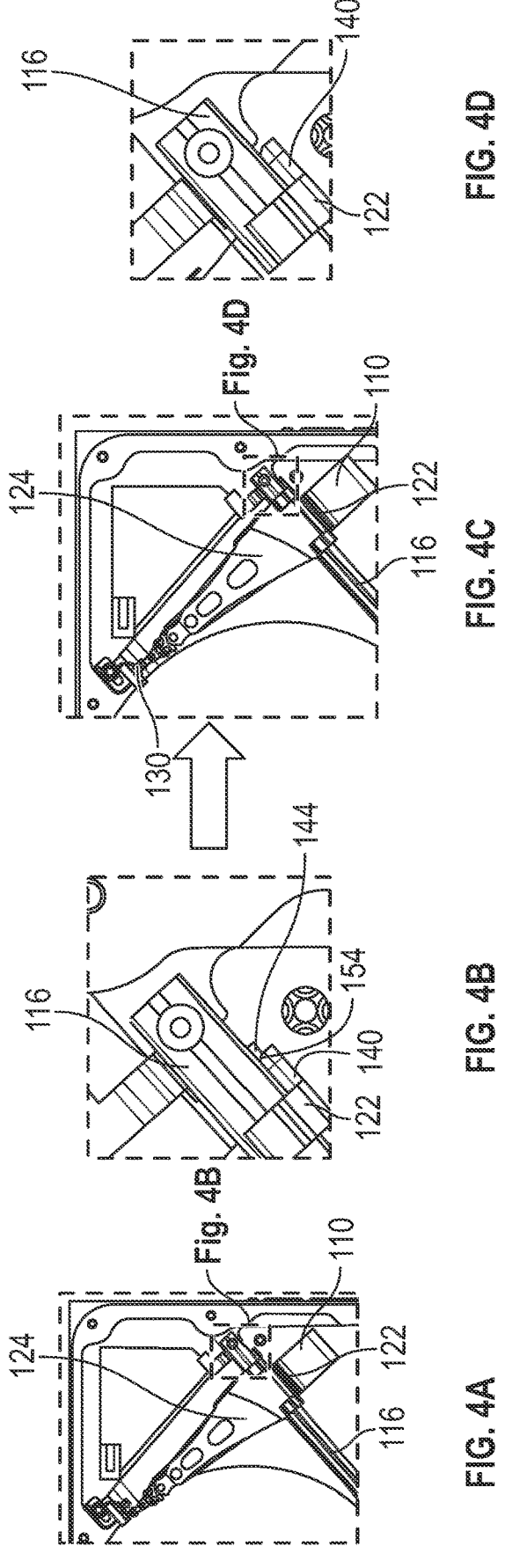
FIGS. 4A-4D are top views of portions of the data storage device of FIGS. 1A-1C that together illustrate latch operation during an emergency head unload operation.

FIGS. 4A-4D are top views of portions of the data storage device of FIGS. 1A-1C that together illustrate latch 132 operation during an emergency head unload operation. FIGS. 4B and 4D are enlarged views of portions of FIGS. 4A and 4C, respectively. An emergency head unload is carried out when power is suddenly cut off from the data storage device 100. When a loss of power to the data storage device 100 occurs, the actuator mechanism 110 rapidly moves the carriage 122 with the attached E-block 125 including heads 102 to the parked position. In this case, a sloped and/or rounded edge (or corner radii) of the rapidly-moving carriage extension 140 makes contact with a sloped surface 154 of latch pin 144 and pushes the latch pin 144, causing it to retract into the rail 116. Sloped surface 154 is inclined so that its height dimension (perpendicular to direction 162) increases in direction 162. FIGS. 4A and 4B show the position of the linear actuator assembly 114 at a point at which the carriage extension 140 makes contact with the latch pin 144. FIGS. 4C and 4D show the position of the linear actuator assembly 114 at a point where the latch pin 144 has been pushed into the rail 116 and the blind hole 138 is aligned with the latch pin 144. At this position, the spring 146 pushes the latch pin 144 into the blind hole 138 in the carriage extension 140, thereby locking the carriage 122.

In different embodiments, different types of springs 146 may be used in the solenoid latch mechanism 134. Some examples of solenoid latch mechanisms 134 with different types of springs 146 are described below in connection with FIGS. 5A through 7B. The latch pin 144 design may also be different for different types of springs utilized.

For example, three specific embodiments of solenoid latch mechanism 134 described, and in some cases they will be differentiated by referring to the first embodiment with reference number 134A (FIGS. 5A and 5B), the second embodiment with reference to number 134B (FIGS. 6A and 6B), and the third embodiment with reference to number 134C (FIGS. 7A and 7B). However, in many aspects, the solenoid latch mechanisms are similar; descriptions of solenoid latch mechanism 134, 134A, 134B or 134C apply to all embodiments unless otherwise specified. This convention also applies to other similarly numbered elements.

Figure 5A:
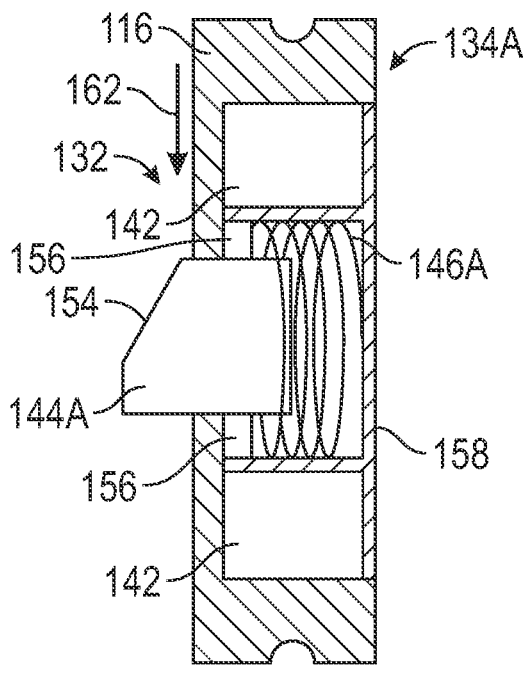
FIGS. 5A and 5B are cross-sectional views that illustrate a solenoid latch including a compression spring in accordance with one embodiment.
Figure 5B:
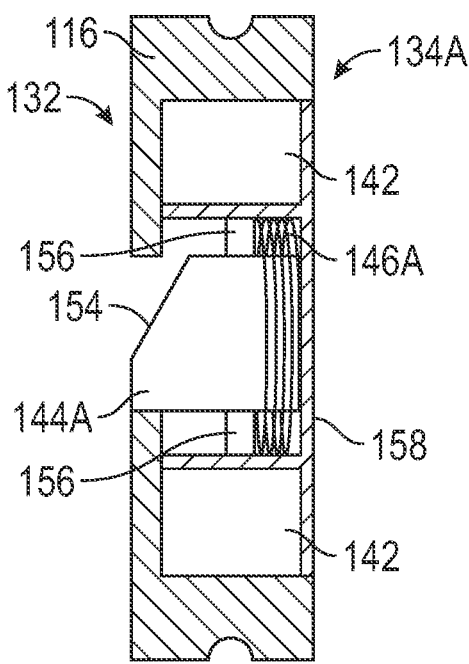

FIGS. 5A and 5B are cross-sectional views that illustrate a solenoid latch mechanism 134A including a compression spring 146A in accordance with one embodiment. FIG. 5A illustrates a normal or closed position of a latch pin 144A, and FIG. 5B illustrates a retracted position of the latch pin 144A. As can be seen in FIGS. 5A and 5B, a suitable stopping mechanism (e.g., a ring) 156 is attached to or integrated with latch pin 144A to properly hold the compression spring 146A, which surrounds a portion of the latch pin 144A between the stopping mechanism 156 and a housing plate 158 of the latch mechanism 132. The stopping mechanism 156 ensures that the portion of the latching mechanism between the stopping mechanism 156 and a housing plate 158 remains within the rail 116 in both the normal or closed position of FIG. 5A and the retracted position in FIG. 5B. To retract latch pin 144A (move from FIG. 5A to FIG. 5B), electrical current is applied to coil 142, which causes latch pin 144A and ring 156 to move to the right, thereby compressing spring 146A. Once blind hole 138 of carriage 122 is aligned with latch pin 144A of rail 16, the current flow is ceased, and spring 146A mechanically biases ring 156 and latch pin 144A back to the position shown in FIG. 5A.

FIGS. 6A and 6B are cross-sectional views that illustrate a solenoid latch mechanism 134B including an elastic sheet spring 146B in accordance with one embodiment. FIG. 6A illustrates a normal or closed position of a latch pin 144B, and FIG. 6B illustrates a retracted position of the latch pin 144B. In the embodiments of FIGS. 6A and 6B, a nub 160 is included behind the latch pin 144B. The nub 160 is in contact with the elastic sheet spring 146B. As can be seen in FIG. 6A, in the normal or closed position, the elastic sheet spring 146B pushes the latch pin 144B such that it protrudes outside the rail 116. When electrical power is supplied to solenoid coil 142, a magnetic field forms around the coil 142 that draws the latch pin 144B inwardly, thereby causing the nub 160 to push against the elastic sheet spring 146B, as shown in FIG. 6B. Once blind hole 138 of carriage 122 is aligned with latch pin 144B of rail 16, the electrical current flow is ceased, and spring 146B mechanically biases latch pin 144B back to the position shown in FIG. 6A. Elastic sheet spring 146B may be made of rubber, plastic or any material or combination of materials with suitable elastic properties that allow deformation as shown in FIG. 6B and automatic resilient return to the configuration of FIG. 6A.

FIGS. 7A and 7B are cross-sectional views that illustrate a solenoid latch mechanism 134C including a flat steel spring 146C in accordance with one embodiment. FIG. 7A illustrates a normal or closed position of a latch pin 144C, and FIG. 7B illustrates a retracted position of the latch pin 144C. As can be seen in FIGS. 7A and 7B, no nub such as 160 of FIGS. 6A and 6B is employed to push the flat sheet spring 146C. In other respects, the embodiment of FIGS. 7A and 7B is structurally similar to and operates in a manner similar to the embodiment of FIGS. 6A and 6B.

FIG. 8 is a flowchart of a method 200 in accordance with one embodiment. The method 200 includes providing a data storage disc having a read/write surface at 202. At 204, an arm extending along an arm axis and having a head end that supports a head that is capable of interacting with the read/write surface is provided. At 206, a rail extending along a rail axis that is normal to the arm axis is provided. At 208, a carriage is coupled to the arm. At 210, the carriage is movably coupled to the rail. At 212, the carriage is enabled to be releasably latched to the rail.

The illustrations of the embodiments described herein are intended to provide a general understanding of the structure of the various embodiments. The illustrations are not intended to serve as a complete description of all of the elements and features of apparatus and systems that utilize the structures or methods described herein. Features described with respect to any embodiment also apply to any other embodiment. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description. All patent documents mentioned in the description are incorporated by reference.

The Abstract of the Disclosure is provided to comply with 37 C.F.R. § 1.72 (b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. For example, features described with respect to one embodiment may be incorporated into other embodiments. Thus, to the maximum extent allowed by law, the scope of the present disclosure is to be determined by the broadest permissible interpretation of the following claims and their equivalents, and shall not be restricted or limited by the foregoing detailed description.

What is claimed is:
1. A data storage device comprising:
a data storage disc having a read/write surface defining an x-y plane;
a ramp adjacent to an outer diameter of the data storage disc; and
a linear actuator assembly comprising:
a rail extending along a rail axis and having a first engagement member;
a carriage movably coupled to the rail and having a second engagement member configured for coupling to the first engagement member;
an arm coupled to the carriage and extending along an arm axis that is normal to the rail axis, the arm having a head end that is movable relative to the data storage disc by movement of the carriage along the rail in the x-y plane, wherein the arm is coupled to the carriage at an end of the arm that is opposite to the head end of the arm; and
a head supported by the head end of the arm, wherein the head is configured to communicate with the read/write surface when positioned at the data storage disc, and wherein the head end of the arm is configured to be supported by the ramp when retracted away from the data storage disc;

wherein the first and second engagement members are configured to couple together proximate to the end of the arm that is opposite to the head end of the arm when the head end of the arm is supported by the ramp, thereby latching the carriage to the rail.

2. The data storage device of claim 1, wherein the first engagement member includes a solenoid latch, and the second engagement member includes a hole in the carriage configured to receive a pin of the solenoid latch.

3. The data storage device of claim 2, wherein the solenoid latch is located within a hole in the rail.

4. The data storage device of claim 3, wherein the solenoid latch comprises a helical coil positioned around the pin and configured to produce a magnetic field when an electrical current is passed through the helical coil to thereby draw the pin into the hole in the rail.

5. The data storage device of claim 4, wherein the solenoid latch further comprises a spring configured to apply a force to the pin such that a portion of the pin is pushed outside the hole in the rail when the electrical current is not passed through the helical coil.

6. The data storage device of claim 5, wherein the spring comprises a compression spring, an elastic sheet spring or a steel spring.

7. The data storage device of claim 3, wherein the pin comprises a sloped surface configured to enable the carriage to push the pin into the hole in the rail.

8. An apparatus comprising:

a data storage disc having a read/write surface;

an arm extending along an arm axis and having a head end that supports a head that is configured to interact with the read/write surface;

a rail extending along a rail axis that is normal to the arm axis;

a carriage coupled to the arm at an end of the arm that is opposite to the head end of the arm and movably coupled to the rail; and a latch mechanism configured to releasably hold the carriage to the rail at a fixed position proximate to the end of the arm that is opposite to the head end of the arm.

9. The apparatus of claim 8, wherein the latch mechanism includes a first engagement member that is in the rail and a second engagement member that is in the carriage.

10. The apparatus of claim 9, wherein the first engagement member includes a solenoid latch, and the second engagement member includes a hole in the carriage configured to receive a pin of the solenoid latch.

11. The apparatus of claim 10, wherein the solenoid latch is located within a hole in the rail.

12. The apparatus of claim 11, wherein the solenoid latch comprises a helical coil positioned around the pin and configured to produce a magnetic field when an electrical current is passed through the helical coil to thereby draw the pin into the hole in the rail.

13. The apparatus of claim 12, wherein the solenoid latch further comprises a spring configured to apply a force to the pin such that a portion of the pin is pushed outside the hole in the rail when the electrical current is not passed through the helical coil.

14. The apparatus of claim 13, wherein the spring comprises a compression spring, an elastic sheet spring or a steel spring.

15. The apparatus of claim 11, wherein the pin comprises a sloped surface configured to enable the carriage to push the pin into the hole in the rail.

16. A method comprising:

providing a data storage disc having a read/write surface;

providing an arm extending along an arm axis and having a head end that supports a head that is capable of interacting with the read/write surface;

providing a rail extending along a rail axis that is normal to the arm axis;

coupling a carriage to the arm at an end of the arm that is opposite to the head end of the arm;

movably coupling the carriage to the rail; and enabling the carriage to be releasably latched to the rail proximate to the end of the arm that is opposite to the head end of the arm.

17. The method of claim 16, wherein the enabling the carriage to be releasably latched to the rail comprises providing a hole in the carriage that is capable of receiving a pin from the rail when the carriage is positioned at a predetermined location along the rail, at which the hole is aligned with the pin.

18. The method of claim 17, wherein the carriage is moveable along the rail to the predetermined location at multiple speeds.

19. The method of claim 18, wherein the multiple speeds comprise a first speed at which:

the pin is withdrawn into the rail before the carriage reaches the predetermined location; and the pin is inserted into the hole when the carriage is at the predetermined location and the hole is aligned with the pin.

20. The method of claim 19, wherein the multiple speeds comprise a second speed at which:

the carriage collides with a portion of the pin that protrudes outside the rail as the carriage approaches the predetermined location, thereby causing the pin to be pushed into the rail; and the pin is inserted into the hole when the hole is aligned with the pin.

* * * * *